No. 861,972. PATENTED JULY 30, 1907.
F. GRAZIANO.
RECORDER.
APPLICATION FILED AUG. 30, 1906.

2 SHEETS—SHEET 1.

Witnesses
O. W. Holmes
N. C. Healy

Inventor
Frank Graziano
By James Sheehy
Attorney

THE NORRIS PETERS CO., WASHINGTON, D. C.

No. 861,972. PATENTED JULY 30, 1907.
F. GRAZIANO.
RECORDER.
APPLICATION FILED AUG. 30, 1906.
2 SHEETS—SHEET 2.
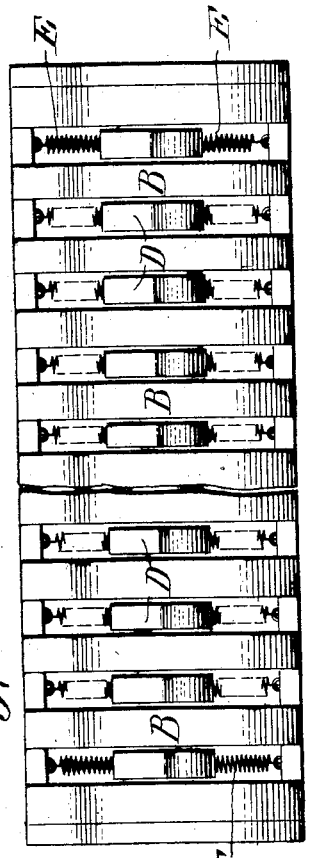
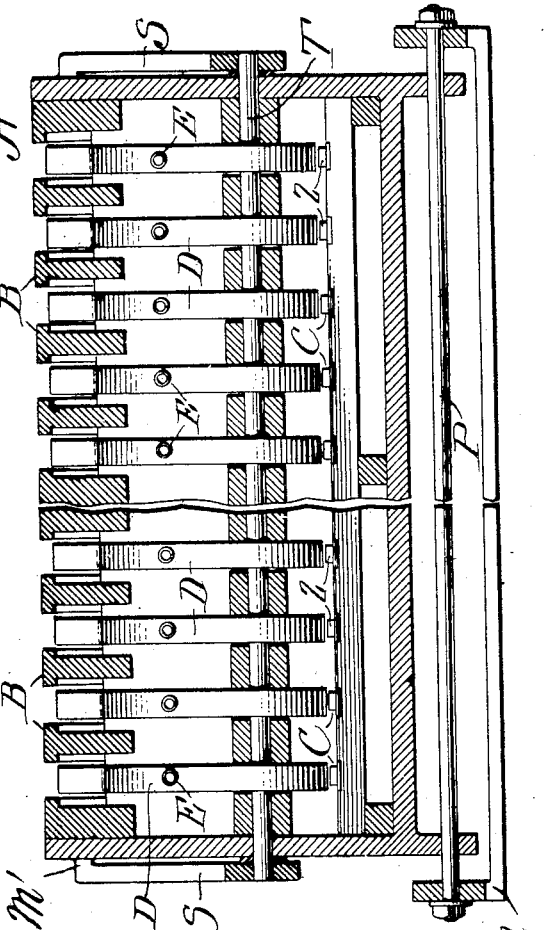
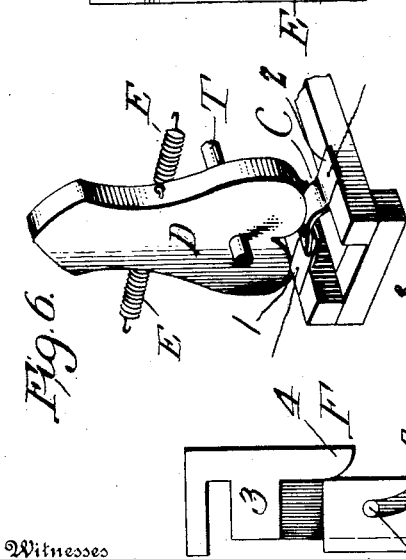
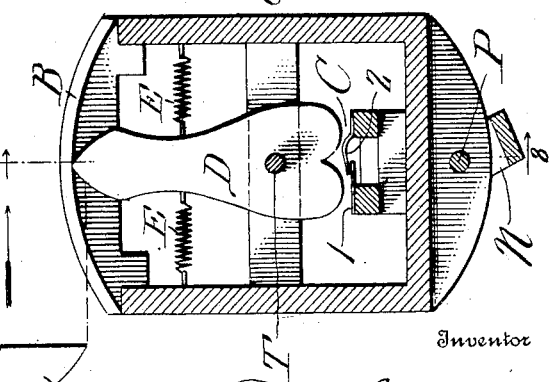
Witnesses
O. W. Holmes
N. C. Healy
Inventor
Frank Graziano
By James J. Sheehy
Attorney

UNITED STATES PATENT OFFICE.

FRANK GRAZIANO, OF NEW ORLEANS, LOUISIANA.

RECORDER.

No. 861,972.      Specification of Letters Patent.      Patented July 30, 1907.

Application filed August 30, 1906. Serial No. 332,664.

*To all whom it may concern:*

Be it known that I, FRANK GRAZIANO, a citizen of the United States, residing at New Orleans, in the parish of Orleans and State of Louisiana, have invented new and useful Improvements in Recorders, of which the following is a specification.

My invention pertains to recorders or recording apparatus; and it contemplates the provision of a reliable electro-mechanical apparatus for automatically recording the time at which each of the plurality of cars of a railroad passes a certain predetermined point, this with a view of causing the conductors of the cars to maintain a proper schedule.

Figure 1:
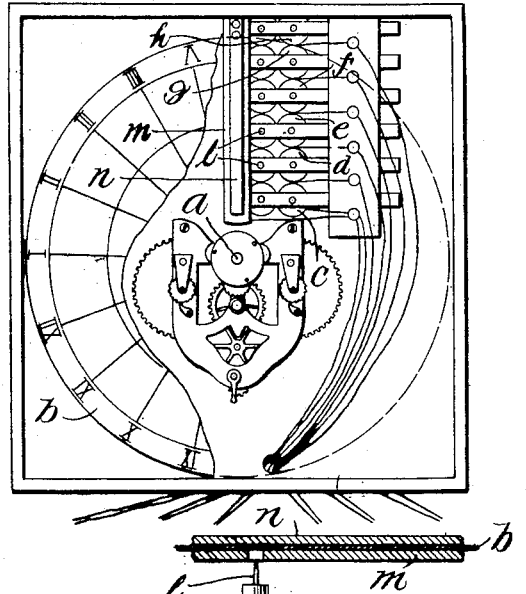
Figure 2:
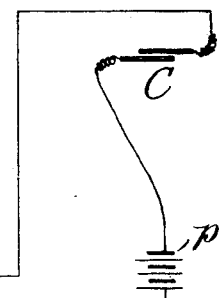
Figure 3:
Figure 3:
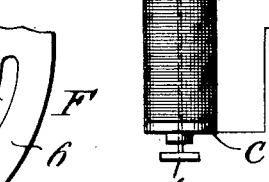
Figure 3:
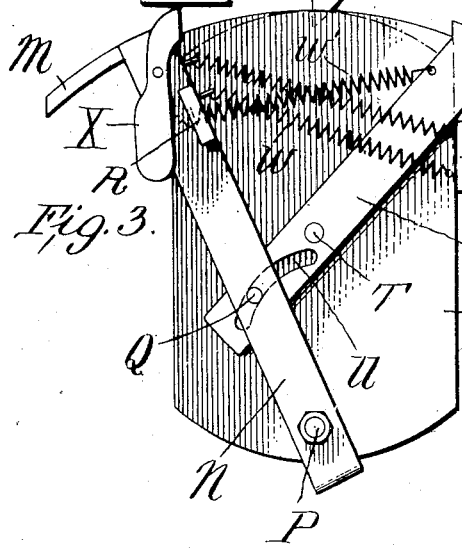
Figure 4:
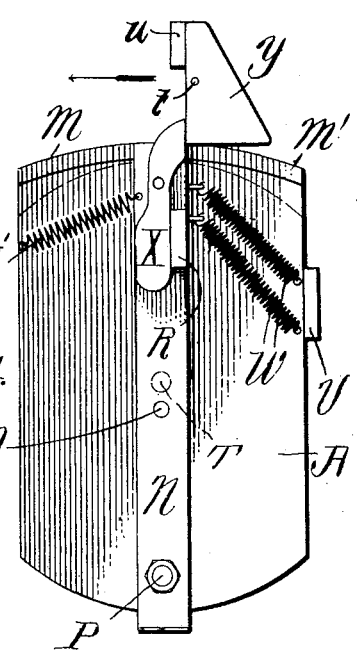

With the foregoing in mind, the invention will be fully understood from the following description and claims when the same are read in connection with the accompanying drawings, forming part of this specification, in which:

Figure 1 is a plan view illustrative of the clock and the electro-mechanical devices embraced in the apparatus constituting the present and preferred embodiment of my invention. Fig. 2 is a diagrammatic view illustrating the revoluble dial of the clock, one of the electro-magnets and its armature, and the battery and switch arranged in an electric circuit with the electro-magnet. Fig. 3 is a view illustrating in end elevation and as open the casing containing the track parts of my apparatus, and also illustrating in proper juxtaposition the car device for opening the casing and the car device for closing one switch. Fig. 4 is a view similar to Fig. 3, but showing the casing as closed. Fig. 5 comprises disconnected views of a car device for closing a switch in the casing, and the said casing; the casing being shown in transverse section and without cover sections. Fig. 6 is a detail perspective view illustrating one of the normally open switches and the lever through which the same is closed. Fig. 7 is a broken plan view of the casing shown in Fig. 5, and: Fig. 8 is a broken section of said casing, taken in the plane indicated by the line 8—8 of Fig. 5.

Similar letters and numerals designate corresponding parts in all of the views of the drawings, referring to which:

A is a casing designed to be arranged crosswise in the bed of a railway and between the rails thereof at any desired point. The said casing is provided at its top with equi-distant grate bars B extending in the direction of the length of the railway; and it is designed to contain a plurality of electric switches C, and a plurality of switch-closing levers D which rest with their upper ends between the bars B, and are normally held in and returned to the positions shown by springs E interposed between their opposite edges and the adjacent walls of the casing. The switches C and levers D correspond in number to the cars employed in the operation of the railway; and the switches respectively comprise a lower member 1, and an upper, resilient member 2 which normally springs and rests away from member 1.

Each of the cars of the railway is to be equipped with a device F best shown in Fig. 5; the device F of car No. 1 being positioned to engage the lever D at the left of Fig. 8, the device F of car No. 2 being positioned to engage the next lever D, and so on throughout the series of cars and switch-closing levers. The car device F preferably, though not necessarily, comprises an upper member 3 fixed with respect to the truck or other suitable part of the car and having a forward abutment 4 and a lateral stud 5, and a lower member 6 notched at 7 and pivoted and movable vertically on the stud 5. In virtue of this when the car carrying the device F travels over the case A in the direction indicated by the large arrow in Fig. 5, the member 6 will obviously strike and rock its complementary lever D so as to close the electric switch below said lever. When, however, the car is backed or moved over the case A in the direction opposite to that indicated by the large arrow, the member 6 of the car device will trail and move upward and hence will ride idly over its complementary lever D—i. e., will not rock said lever.

In connection with the switches C I employ the clock and electro-mechanical devices illustrated in Figs. 1 and 2; the said clock and electro-mechanical devices being designed to be located in the railway office or in a locked box placed at any desired point along the line of the railway. The clock, which is of a well known type, comprises a post $a$ so geared to the clock movement that it will make one complete revolution in twelve hours, and a dial $b$, preferably of paper, detachably connected to the post $a$ so as to revolve therewith, and divided into spaces, as shown, each space passing a line extending radially from the post $a$ in one hour.

$c, d, e, f g$ and $h$ are a series of electro-magnets which are provided with armatures $k$, each of said armatures being hinged at one end and provided at its opposite end with a needle $l$. The needles pass from their armatures up through the lower of two guide bars $m$ and $n;$ said bars $m$ and $n$ acting to guide and hold the dial $b$ in position to be pierced by the points of the needles. Each of the electro-magnets is arranged in an electric circuit with a source of electric energy $p$ and one of the switches C, as shown diagrammatically in Fig. 2, and hence it will be noted that when the car having a device F arranged to rock the lever D above such particular switch passes in the proper direction over the casing A, the switch will be closed and the electro-magnet energized to force the needle $l$ through the dial $b$. In this way the time at which the particular car mentioned passed over the casing A will be recorded on or in the dial $b$, and from this it follows that at the end of each period of twelve hours a person in authority may by scrutinizing the dial $b$ ascertain the times at which the several cars of the railway passed over the casing A, which is obviously materially advantageous. At the expiration of the period stated, the dial $b$ of the clock is replaced with a fresh dial, when the operation described will be repeated.

When the casing A is to be located in a city, I prefer to provide it with the cover sections M and M′ illustrated in Figs. 3 and 4. The cover section M is fixed to the arms of a swinging bail-shaped frame N which is carried by a rod P mounted in the casing A as shown. The arms of the frame N are provided with inwardly extending studs Q, and on one of said arms is a lateral stop R for a purpose presently set forth. The cover section M′ is provided with arms S which are pivoted at T to the ends of the casing A, and have arcuate slots U receiving the studs Q of the frame N. Between one arm of the frame N and a lateral projection V on the casing A are interposed one or more springs W, the purpose of which is to draw the cover section M to a closed position; and when said cover section M is drawn to a closed position, the cover section M′ will, through the connection described, be moved to a closed position. The cover section M′ is assisted in moving to its closed position by a spring W′.

For the purpose of automatically opening the cover sections M and M′, I provide the lever X on one arm of the frame N, and a car device Y; the said car device being arranged on the car slightly in advance of the car device F. The lever X is fulcrumed at an intermediate point of its length on the frame N, and is provided with a comparatively heavy lower arm which normally rests against the stop R. The car device is pivoted at $t$ and is arranged to normally rest with its upper arm against a stop $u$. Thus when the car device is moved in the direction of the arrow in Fig. 3 it will by engaging the upper arm of lever X open the cover sections and hold said cover sections open while the car device F is rocking its complementary lever D. When, however, the car device is moved in the direction opposite to that indicated by the arrow, it will ride idly over the lever X and hence will not open the cover sections M and M′.

As shown in Fig. 4, the cover sections M M′ in their closed positions will exclude the weather from the interior of the casing A, and at the same time will effectually prevent heavy wagons from injuring the grate bars B or any other parts of the apparatus.

It will be gathered from the foregoing that in addition to the advantages ascribed to my novel apparatus, the same is simple and inexpensive in construction and is well adapted to withstand the usage to which such apparatus is ordinarily subjected.

The construction herein shown and described constitutes the present and preferred embodiment of my invention, but I desire it understood that in practice such changes in the form, arrangement and construction of parts may be made as fairly fall within the scope of my invention as claimed.

Having described my invention, what I claim and desire to secure by Letters-Patent, is:

1. In a recorder, the combination of a casing adapted for arrangement crosswise in the bed of a railway and comprising a body and movable cover sections, means for returning the cover sections to and normally holding the same in a closed position, means on the cover sections of the casing arranged to coöperate with means on cars to enable the latter means to open the cover sections and hold the same open for a limited period, normally open electric switches arranged in the lower portion of the casing body at intervals in the length thereof, vertically swinging, switch closing levers fulcrumed at points intermediate their ends in the casing body and arranged above and in position to engage the switches and also arranged to be moved by devices on passing cars, means for normally holding the said levers in and returning the same to an upright position, and means whereby when each electric switch is closed the time of the passing of its complementary car will be recorded.

2. In a recorder, the combination of a casing adapted for arrangement in the bed of a railway and comprising a body and movable cover sections, means for returning the cover sections to and normally holding the same in a closed position, a movable device in the casing, a car, a device on the car for operating the said movable device, and coöperating means on the cover sections of the casing and the car for opening the cover sections and holding the same open while the car device is moving the said movable device in the casing.

3. In a recording apparatus for the purpose set forth, the combination of a casing adapted for arrangement in the bed of a railway and comprising a body, cover sections, a bail-shaped frame pivoted to the body and having arms connected to one cover section and also having studs on said arms, arms pivoted to the casing and connected to the other cover section and having slots receiving the studs on the arms of the bail-shaped frame, means for returning the cover sections to and normally holding the same in a closed position, a car, and coöperating means on the bail-shaped frame and the car for opening the cover sections as the car passes.

In testimony whereof I have hereunto set my hand in presence of two subscribing witnesses.

FRANK GRAZIANO.

Witnesses:
CHARLES A. DUCHAMP,
J. M. QUINTERO.